UNITED STATES PATENT OFFICE.

HENRY MARTYN, OF MARTHA'S VINEYARD, MASSACHUSETTS.

IMPROVEMENT IN COMPOSITIONS FOR WATER-PROOFING AND COLORING LEATHER.

Specification forming part of Letters Patent No. 147,337, dated February 10, 1874; application filed January 9, 1874.

*To all whom it may concern:*

Be it known that I, HENRY MARTYN, of Martha's Vineyard, of the county of Dukes and State of Massachusetts, have invented a new and useful Composition for Water-Proofing and Coloring Leather, or various other materials; and I do hereby declare the same, and the ingredients thereof and mode of compounding such, to be fully described as follows:

In making the said composition I usually proceed as follows: To one imperial gallon of water I add three ounces of nut-galls, and heat the water and maintain it at a simmering temperature for about half an hour, so as to thoroughly extract the tannin from the galls. Next I remove the liquid from the galls, and raise it to a boiling heat, and while at a boiling temperature I introduce two ounces of strong spirits of ammonia, borax, or other suitable alkali, and one and one-half pound of gum-shellac, and I stir the whole until thorough solution of the shellac may take place. Next I add to the solution one dram of aniline color in crystal, using generally "aniline-blue," or violet, or both, or an aniline-black, for instance. Next I add to the solution three ounces of vegetable, ivory, or lamp black. After stirring until the latter addition is well incorporated, the composition will be complete and ready for use.

It is to be applied to the boot, shoe, or other article by means of a brush or sponge, and when dry will be found to impart to it a brilliant enamel surface, one impervious to water.

I do not confine my invention to the precise proportions of the ingredients, as hereinbefore stated, as such may be varied somewhat, more or less, without materially changing the character of the invention.

I would remark that the vegetable, ivory, or lamp black will, by the gum, be held in suspension in the liquid.

I claim as my invention—

The composition consisting of a solution of tannin, shellac, spirits of ammonia, or any suitable alkali, one or more aniline colors in crystal, and a quantity of lamp-black in suspension in such solution, substantially as and for the purpose described.

HENRY MARTYN.

Witnesses:
R. H. EDDY,
J. R. SNOW.